United States Patent
Keppler et al.

[15] 3,666,704
[45] May 30, 1972

[54] PRODUCTION OF AQUEOUS DISPERSIONS OF POLYMERS OF OLEFINICALLY UNSATURATED MONOMERS

[72] Inventors: Hans-Georg Keppler, Weinheim; Hermann Wesslau, Bad Duerkheim, both of Germany

[73] Assignee: Badische Anilin & Soda-Fabrik Aktiengesellschaft, Ludwigshafen am Rhineland Rheinland-Pfalz, Germany

[22] Filed: Apr. 27, 1970

[21] Appl. No.: 32,371

[30] Foreign Application Priority Data

Apr. 30, 1969 Germany.....................P 19 21 946.6

[52] U.S. Cl. ..............260/29.6 WB, 260/17 A, 260/17.4 ST, 260/29.6 RW, 260/29.6 WA, 260/29.7, 260/879, 260/880, 260/881, 260/882, 260/883, 260/884, 260/885, 260/886
[51] Int. Cl............................................................C08g 1/13
[58] Field of Search...........260/29.6 RW, 29.6 WB, 29.6 PT, 260/29.7 W, 29.7 DP

[56] References Cited

UNITED STATES PATENTS

| | | | |
|---|---|---|---|
| 3,177,172 | 4/1965 | Adams | 260/29.6 |
| 3,309,330 | 3/1967 | Settlage | 260/29.6 |
| 3,424,706 | 1/1969 | Smith et al. | 260/29.6 |
| 3,510,542 | 5/1970 | Strand | 260/874 |
| 3,513,120 | 5/1970 | Pohlemann et al. | 260/29.6 |

Primary Examiner—William H. Short
Assistant Examiner—E. A. Nielsen
Attorney—Johnston, Root, O'Keeffe, Keil, Thompson & Shurtleff

[57] ABSTRACT

Production of aqueous polymer dispersions containing relatively large polymer particles by polymerizing olefinically unsaturated monomers (A) and, if desired, olefinically unsaturated monomers (A') in aqueous emulsion in the presence of conventional dispersing agents, catalysts and previously prepared emulsion polymers of olefinically unsaturated monomers carried out by adding, during the polymerization of the monomers (A) and, if present, (A') up to a point where 95 percent of said monomers have been converted, minor quantities of previously prepared emulsion polymers in the form of an aqueous dispersion, which emulsion polymers contain from 0.5 to 50 percent of their weight of polymerized units of olefinically unsaturated monomers (B) which when polymerized alone yield water-soluble homopolymers, the proportion of monomers (A') in admixture with the monomers (A) being at least 20 percent (based on the proportion of polymerized units of monomers (B) in the previously prepared emulsion polymer) less than the proportion of polymerized units of the monomers (B) in the previously prepared emulsion polymer.

2 Claims, No Drawings

PRODUCTION OF AQUEOUS DISPERSIONS OF POLYMERS OF OLEFINICALLY UNSATURATED MONOMERS

Polymer dispersions produced by emulsion polymerization usually contain exceptionally fine polymer particles and their particle size distribution is usually very narrow. In some applications, however, dispersions containing coarser particles are advantageous. It is well known that dispersions containing fine particles are so viscous, even at relatively low solids contents, that they are difficult to handle. Concentrating the dispersions to higher solids contents is generally only possible at considerable expense and is in some cases not possible at all. By contrast, dispersions containing coarse particles are less viscous, are readily concentrated and flow well even in the case of high solids contents.

Attempts have been made to make coarse-particle dispersions by adding emulsifying agents during polymerization. In many cases, however, this leads to the formation of considerable quantities of coagulate. Moreover, an increase in the polymerization time has often to be put up with.

Although emulsion polymerization carried out in the presence of protective colloids, such as polyvinyl alcohol or hydroxyethyl cellulose, produces coarse dispersions, particularly in the case of vinyl esters (see German Pat. No. 1,029,565), the presence of such protective colloids results in an undesirable increase in viscosity. In addition, German Printed Application No. 1,223,160 discloses that coarse-particle synthetic rubber latices may be prepared by adding an aqueous solution of an alkali polyacrylate as agglomerating agent during the emulsion polymerization. However, this method produces aqueous butadiene polymer dispersions which provide film exhibiting relatively high water absorption.

Finally, U.S. Pat. No. 2,993,020, for example, discloses the preparation of coarse dispersions by the method of agglomeration by freezing in which fine-particle synthetic rubber dispersions are frozen and then thawed. However, this method is as a rule relatively expensive and cannot be generally applied to polymer dispersions prepared with any desired emulsifying agent and having any desired pH. Moreover, this method frequently leads to the formation of considerable quantities of coagulate.

It is an object of the invention to provide a process for the manufacture of stable aqueous polymer dispersions in which the polymer particles have a larger diameter than in aqueous polymer dispersions which have been produced by direct polymerization in the conventional manner.

We have found that the production of aqueous dispersions of polymers of olefinically unsaturated monomers (A) by polymerizing the said monomers (A) and, if desired, olefinically unsaturated monomers (A') in aqueous emulsion in the presence of conventional dispersing agents, catalysts and previously prepared emulsion polymers of olefinically unsaturated monomers can be advantageously carried out by adding, during the polymerization of monomers (A) and, if present, (A') up to a point where 95 percent of these monomers have been converted, in the form of an aqueous dispersion 0.1 to 30 percent by weight (based on the monomers (A) and, if present, the monomers (A')), of the previously prepared emulsion polymers which contain from 0.5 to 50 percent of their weight of polymerized units of olefinically unsaturated monomers (B) which when polymerized alone yield water-soluble homopolymers, the proportion of monomers (A') in admixture with the monomers (A) being at least 20 percent (based on the proportion of polymerized units of monomers (B) in the previously prepared emulsion polymer) smaller than the said proportion of monomers (B) in the previously prepared emulsion polymer. The process according to this invention produces stable aqueous polymer dispersions in which the dispersed polymer particles are much larger that they would have been with the same composition if polymerization had been carried out in a conventional manner.

In the new process conventional olefinically unsaturated monomers may be polymerized in the usual monomer ratios either alone or as mixtures using emulsifying agents and dispersing agents and catalysts commonly used for their polymerization under the temperature and pressure conditions normally employed in the emulsion polymerization of said monomers using said dispersing agents and catalysts since none of these factors is essential for the invention. The dispersing agents contained in the added previously prepared polymer dispersions must of course be compatible with the other dispersing agents and auxiliaries such as catalysts used in the new emulsion polymerization process. Moreover, previously prepared emulsion polymers must contain a larger proportion of polymerized units of olefinically unsaturated monomers (B), which when polymerized alone yield water-soluble homopolymers, than the emulsion polymers prepared by the process of the invention.

Examples of olefinically unsaturated monomers (A) from which coarse polymer dispersions may be obtained by the novel process are monoolefinically unsaturated carboxylic esters of from four to 20 carbon atoms, such as vinyl esters of saturated monocarboxylic acids having from two to 12 carbon atoms, e.g., vinyl acetate, vinyl propionate, vinyl n-butyrate, vinyl laurate, vinyl stearate and vinyl esters of carboxylic acids prepared by reacting olefins with carbon monoxide and water in the presence of sulfonic acid, esters of $\alpha,\beta$-olefinically unsaturated mono- and di-carboxylic acids having preferably three to five carbon atoms with linear, branched or cyclic alkanols having from one to 18 carbon atoms, particularly methyl, ethyl, n-butyl, tert-butyl, cyclohexyl, 2-ethylhexyl, lauryl and stearyl esters of acrylic, methacrylic, crotonic, maleic, fumaric and/or itaconic acids, monovinyl aromatic monomers, such as styrene, $\alpha$-methylstyrene, vinyl toluenes, vinyl xylenes, vinyl ethyl benzenes and chlorostyrenes, nitriles of $\alpha,\beta$-monoolefinically unsaturated carboxylic acids containing preferably two to three carbon atoms, particularly acrylonitrile and/or methacrylonitrile, vinyl halides and/or vinylidene halides, particularly vinyl chloride and vinylidene chloride, as well as 1,3-dienes containing from four to six carbon atoms, particularly butadiene and isoprene. Such monomers (A) are polymerized in emulsion according to the invention in proportions ranging from 85 to 100 percent, usually from 90 to 100 percent, by weight based on the total monomers (A).

Suitable monomers (A'), their proportion being up to 15 percent, usually only up to 10 percent, by weight based on the total amount of monomers (A), are monoolefinically unsaturated monomers containing reactive groups such as $\alpha,\beta$-monoolefinically unsaturated carboxylic acids containing preferably from three to five carbon atoms, in particular mono- and/or di-carboxylic acids and/or their substituted or unsubstituted aides, in particular, their N-hydroxymethylamides and their N-alkoxymethylamides containing from one to four carbon atoms in the alkyl radical, in particular acrylic acid, methacrylic acid, crotonic acid, maleic acid, itaconic acid, acrylamide, methacrylamide, maleimide, maleic anhydride, maleic diamide, crotonamide, itaconamide, N-methylol acrylamide, N-methylol methacrylamide, N-methoxymethyl acrylamide and/or N-methoxymethyl methacrylamide, N-ethoxymethyl acrylamide and/or N-ethoxymethyl methacrylamide and/or N-n-butoxymethyl acrylamide and/or N-N-butoxymethyl methacrylamide, N-n-butyl methacrylamide, N-acetoxymethyl acrylamide and/or N-acetoxymethyl methacrylamide, as well as vinyl sulfonic acid, vinyl phosphonic acid and their salts, heterocyclic monovinyl compounds, such as vinyl pyrrolidone, N-vinyl imidazolium salts, vinyl pyridines, vinyl caprolactam and N-vinyl carbazole. The proportion of such monomers (A') is usually from 0.1 to 10 percent, particularly from 0.5 to 6 percent, by weight. Accordingly, the proportion of the abovementioned monomers (A) is usually between 99.9 and 90 percent, particularly between 99.5 and 94 percent, by weight based on the total amount of monomers (A) + (A'). The proportion of monomers (A') in admixture with monomers (A) must always be at least 20 percent less than the proportion of monomers (B) contained as polymerized units in the previously prepared emulsion polymer in addition to monomers (A). Thus, if the previously prepared emulsion polymer contains 10 percent of its weight of monomers (B) in addition to 90 percent of its weight of monomers (A), as polymerized units, then there should be present in addition to the monomers (A), less than 8 percent by weight of monomers (A') based on the mixture of monomers (A) + (A'), for example 0 or 7.5 percent by weight.

Suitable emulsifying agents which are used in the present process in conventional quantities, i. e. generally in quantities of from 0.5 to 5 percent by weight based on the weight of monomers (A), are those commonly used for monomers (A) or mixtures of monomers (A) to be polymerized in aqueous emulsion, such as are described in detail in Houben-Weyl, "-Methoden der organischen Chemie," volume XIV/1 "-Makromolekulare Stoffe," Georg-Thieme-Verlag, Stuttgart, 1961, pp. 192 to 208. Suitable anionic emulsifying agents are for example lauryl sulfate, p-isooctylbenzene sulfonate, dodecyl sulfonic acid, sulfuric acid semi-esters of addition products of alkylene oxides, particularly ethylene oxide, with alkyl phenols, in particular p-isooctyl phenyl, which addition products usually bear from 10 to 50 ethylene oxide radicals. Suitable anionic emulsifying agents also includes soaps, such as alkali metal or ammonium salts of fatty acids, such as palmitic, oleic and stearic acids. Nonionic emulsifying agents may also be included, for example products such as are obtained by the addition of alkylene oxides, in particular ethylene oxide, to fatty acids, such as palmitic, oleic or stearic acids, fatty alcohols, such as sperm oil alcohol, or fatty amines, such as stearyl amine or oleyl amine, and fatty acid amides, such as stearic acid amide or lauric acid amide, such addition products usually containing from 10 to 50 ethylene oxide units. In some cases conventional protective colloids may be additionally included in small quantities, if desired.

Suitable catalysts for the process of the invention are for example water-soluble peroxidic compounds, such as hydrogen peroxide and alkali metal and ammonium persulfates, as well as free radical-forming initiators soluble in oil, such as organic peroxides, e. g. benzoyl peroxide, p-menthane hydroperoxide and cumene hydroperoxide, and also readily decomposable azo compounds of the azodiisobutyronitrile type.

When using such free radical-forming or peroxidic initiators, the process is usually carried out at temperatures of from about 50° to 100°C, particularly from 60° to 90°C. Where use is made of conventional redox catalyst systems, for example mixtures of peroxidic catalysts of the said type with reducing agents, such as hydrazine, soluble oxidizable sulfoxyl compounds, such as alkali salts of hydrosulfides, sulfoxylates, thiosulfates, sulfides and bisulfides and, if desired, traces of heavy metals as activating systems, the process may be carried out at lower temperatures, for example between about 0° to 50°C. The amount of catalyst used is in the usual range, i. e. generally between 0.005 and 2 percent by weight based on the weight of monomers (A).

Conventional regulators, such as long-chain alkyl mercaptans, unsaturated alcohols, such as sec-butanol, or xanthates such as isopropyl xanthate, may also be used in the present process.

In the process of the invention previously prepared emulsion polymers in the form of aqueous dispersions are added to the polymerization mixtures during polymerization. The amount of previously prepared emulsion polymer added is from 0.1 to 30, preferably from 0.1 to 10, parts by weight per 100 parts by weight of monomers (A). The addition of the previously prepared emulsion polymers should be carried out at a stage where not more than 95 percent of the total monomers (A) have been polymerized. The addition may be made immediately after commencement of polymerization, i. e. practically as soon as polymerization is recognizable for example by the appearance of turbidity. If the previously prepared emulsion polymers are added before the monomers (A) have begun to polymerize, coagulation of the polymer subsequently formed generally occurs. The concentration of the aqueous dispersion of previously prepared emulsion polymer added may be varied within wide limits. The dispersions generally contain (before their addition to the polymerization mixture) from 5 to 60 percent, preferably from 10 to 50 percent, by weight of emulsion polymer based on the previously prepared aqueous dispersion.

The aqueous dispersions of previously prepared emulsion polymer may be made in a conventional manner from olefinically unsaturated monomers of the kind stated above using conventional dispersing agents and catalysts and the usual conditions of temperature and pressure. In general, the previously prepared emulsion polymers should contain less than 20 percent of polymerized units of 1,3-dienes of the above kind since larger percentages of polymerized units of 1,3-dienes may be troublesome, particularly when the previously prepared emulsion polymers are introduced in the present process at a stage where the bulk of monomers (A) has not yet been polymerized. However, small proportions of 1,3-dienes in the previously prepared emulsion polymers do not as a rule cause any trouble.

The previously prepared emulsion polymers should contain from 0.5 to 50 percent, preferably from 2 to 15 percent, of their weight of monomers (B) as polymerized units. Suitable monomers (B) which yield water-soluble homopolymers when polymerized alone, are for example $\alpha,\beta$-monoolefinically unsaturated carboxylic acids preferably having from three to six carbon atoms, in particular mono- and/or di-carboxylic acids, such as acrylic acid, methacrylic acid, crotonic acid, maleic acid, fumaric acid, itaconic acid, tetraconic acid and mesaconic acid or their alkali metal or ammonium salts, semi-esters of dicarboxylic acids containing from four to five carbon atoms with alkanols containing from one to three carbon atoms, such as methanol, ethanol and isopropanol, and salts of said semi-esters, as well as optionally N-substituted amides of $\alpha,\beta$-olefinically unsaturated carboxylic acids of the said type, such as acrylamide, methacrylamide, maleic diamide and/or maleic monamide, n-methacrylamide, N-n-butylmethacrylamide, N-methylolacrylamide and N-methylolmethacrylamide, ethers and esters of such N-oxyalkyl carboxylic acid amides, such as methyl, ethyl, 3-oxabutyl, 3,6-dioxaheptyl and 3,6,9-trioxadecyl ethers and ethylene glycol monoether or the acetic and propionic esters of N-methylolmaleimide, and ester amides of $\alpha,\beta$-olefinically unsaturated dicarboxylic acids of the said kind and containing from one to three carbon atoms, N-vinyl amides derived from saturated monocarboxylic acids, such as N-vinyl acetamide, N-vinyl pyrrolidone and N-vinyl caprolactam, semi-esters of monoolefinically unsaturated carboxylic acids of the said kind with glycols and polyglycols, such as ethylene glycol, propylene glycol, 1,2- and 1,3-butylene glycols, 1,2- and 1,4-diethylene glycols, triethylene glycol and tetraethylene glycol, Mannich bases derived from amides of $\alpha,\beta$-monoolefinically unsaturated monocarboxylic acids having three or four carbon atoms, such as acrylamide and methacrylamide, formaldehyde and dialkyl amines containing from one to 12 carbon atoms in the alkyl groups, vinyl sulfonic acid, vinyl phosphonic acid and styrene sulfonic acid and their alkali metal and ammonium salts, and acrylic and methacrylic esters of hydroxyalkyl sulfonic acids, such as isethionic acid. The proportion of such monomers (B) in the previously prepared emulsion polymers should be 20 percent larger than the proportion of such monomers in admixture with monomers (A) where the process of the invention is to be used to manufacture copolymers containing polymerized units of said monomers (B). The proportion of monomers (B) in the previously prepared emulsion polymers should only be sufficiently high to ensure that the emulsion polymers are aqueous dispersions, i. e. that the previously prepared emulsion polymers are insoluble in the aqueous medium when added to the monomers (A) being polymerized in emulsion. Previously prepared emulsion polymers in which the concentration of monomers (B) is so high that they dissolved under alkaline conditions, for example at pH 9 may thus only be used in neutral or acid media (i.e. if they are present in the form of a dispersion and not a solution).

The previously prepared emulsion polymers contain in addition to the monomers (B) units of other olefinically unsaturated monomers, for example monoolefinically unsaturated carboxylic acid esters, monovinyl aromatic compounds, vinyl and/or vinylidene halides and/or nitriles of α,β-olefinically unsaturated carboxylic acids, as well as, if desired, vinyl ethers, vinyl ketones and/or vinyl sulfonic acid esters. Olefinically unsaturated monomers of this kind have been listed above in respect of monomers (A). The proportion of such monomers (A) contained as polymerized units in the previously prepared emulsion polymer in addition to the monomers (B) is generally between 50 and 99.5 percent, preferably between 85 and 98 percent, by weight, based on the total previously prepared emulsion polymer. If the previously prepared emulsion polymers contain acid groups, such as carboxyl or sulfonic acid groups, they are particularly effective at pH values above 7. In some cases it is advantageous for the previously prepared emulsion polymer to be composed of the same monomers as are to be polymerized in emulsion by the process of the invention.

In a special embodiment of the process of the invention those previously prepared aqueous dispersions of emulsion polymers are used which have been made by first copolymerizing part of the monomers (B) with other olefinically unsaturated monomers of the kind stated above and then grafting monomers (B) or a mixture of olefinically unsaturated monomers containing a relatively high percentage of monomers (B) onto the said copolymer. Such previously prepared aqueous dispersions of emulsion copolymers are highly effective even when they contain only a relatively small proportion of monomers (B).

In another embodiment, use in made of aqueous dispersions of previously prepared emulsion polymers in which hydrophilic groups are produced on the polymer particles after the latter have been formed, for example by saponification of polymerized units of esters or nitriles of unsaturated carboxylic acids containing at least three carbon atoms or by saponification of polymerized units of vinyl esters, in particular vinyl acetate. Highly effective aqueous dispersions of a previously prepared emulsion polymer of this kind are for example partially saponified polyvinyl acetate dispersions wherein the acetate groups have been partially saponified in acid or alkaline medium after the dispersion had been prepared. Partially saponified aqueous dispersions of vinyl acetate copolymers containing, in general, more than 30 percent of polymerized units of vinyl acetate are also suitable. Such partially saponified aqueous dispersions of vinyl acetate polymers may be formally regarded as those dispersions of mixtures of olefinically unsaturated monomers which contain polymerized units of vinyl alcohol as monomer (B). The previously prepared emulsion polymers contain from 0.5 to 50 percent, preferably from 2 to 25 percent, of their weight of polymerized units of monomers (B). In some cases a concentration of as low as 0.5 to 3 percent by weight of such monomers is sufficient, particularly where these monomers are grafted, together with other olefinically unsaturated monomers, onto a backbone polymer which may or may not contain polymerized units of monomers (B). The composition of the previously prepared emulsion polymer may be varied within wide limits as regards the choice of olefinically unsaturated monomers which, when polymerized alone, yield water-insoluble homopolymers, and may advantageously be similar to the composition of the polymer to be produced by the process of the invention. Particularly suitable for the manufacture of aqueous dispersions containing a major proportion of polymerized units of acrylic esters are for example previously prepared aqueous dispersions of copolymers containing from 90 to 95 percent of their weight of polymerized units of acrylic and/or methacrylic acid esters of linear or branched alkanols of from one to four carbon atoms and from 5 to 10 percent of their weight of polymerized units of amides of α,β-olefinically unsaturated carboxylic acids having from three to five carbon atoms. Also very suitable are previously prepared aqueous dispersions of copolymers comprising from 90 to 96 percent by weight of acrylic and/or methacrylic acid esters of linear or branched alkanols having one to four carbon atoms and from 4 to 10 percent by weight of α,β-olefinically unsaturated carboxylic acids having preferably from three to five carbon atoms, such as mono- and di-carboxylic acids. The effectiveness of the said previously prepared dispersions containing carboxyl groups may be increased by using them in emulsion polymerization systems at pH values above 7.

The addition of the previously prepared polymer dispersions to the polymerization mixture may be effected as a single addition at the commencement of polymerization or portionswise or continuously during polymerization until the conversion of monomers (A) reaches 95 percent. A conversion range of monomers (A) of 20 to 95 percent has proved to be particularly suitable. If the process of the invention is carried out in such a way that a portion of the monomers is partially polymerized in emulsion in the polymerization vessel and the remainder of the monomers is added continuously or portionswise depending on the rate at which they are used up, the previously prepared dispersion may be added to the polymerization mixture either in admixture with an emulsion of the added monomers (A) or separately.

One advantage of the new process is that the operating conditions can be varied within wide limits and that it is suitable for the production of coarse dispersions from a large number of monomers. Another advantage of the present process is that it can be used to prepare coarse dispersions of polymers having a glass temperature above room temperature. The coarse polymer dispersions obtained by the process of the invention generally have a long shelf life and are particularly suitable for the manufacture of films, coatings and paints.

In the following examples, use is made of so-called LP values (light permeability values) as a measure of the average particle size. The LP values indicate the percentage of white light which passes through a 1 cm layer of a 0.01 percent polymer dispersion compared with a 1 cm layer of distilled water under otherwise the same conditions, the measurements being made by photoelectric cell. The smaller the LP value, the larger the average particle size of the polymer dispersion. The surface tension (ST) of aqueous dispersions may also be regarded as a measure of the average particle size when comparing dispersions made by the same method and containing equal amounts of polymers of the same composition and equal amounts of dispersing agents of the same type. The greater the surface tension, the smaller the average particle size of the dispersion.

The invention is further illustrated by the following examples in which parts and percentages are by weight. The following abbreviations are used for the monomers used:

| B | = n butyl acrylate | As | = acrylic acid |
| Bu | = butadiene | MAs | = methacrylic acid |
| St | = styrene | MAM | = methacrylamide |
| N | = acrylonitrile | VAc | = vinyl acetate |
| A | = ethyl acrylate | VPr | = vinyl propionate |
| MM | = methyl methacrylate | M | = methylacrylate |

EXAMPLES 1 to 14

In each example, 400 parts of monomers (A) as indicated in the following table 1 are emulsified in a mixture of 40 parts of a 20 percent aqueous lauryl sulfate solution and 2 parts of potassium persulfate in 560 parts of water. In each case 10 percent of the emulsion of monomeric material is heated to 80°C and polymerized for 15 minutes with stirring. The remaining 90 percent of the monomeric emulsion is then added at a uniform rate in the course of 1 hour. In each case a total of 30 parts of a 40 percent aqueous dispersion, prepared beforehand in a conventional manner, of a copolymer of 95 parts of ethyl acrylate and 5 parts of methacrylamide are added to a certain amount of the feed of the remaining 900 parts of monomeric emulsion, as indicated in the fourth column of table 1 below, this addition being either in a single portion ("G" in column 3 of table 1) or in admixture with the remaining portion of the monomeric emulsion ("Z" in column 3 of table 1). Thus the combination "Z 50" in Table means that after 450 parts of the remaining monomeric emulsion have been added the remaining 450 parts of the monomeric emulsion are metered in at a uniform rate in admixture with the 30 parts of the said 40 percent ethyl acrylate copolymer dispersion. The combination "G 25" means that the 30 parts of the 40 percent ethyl acrylate copolymer dispersion are added in a single portion after 225 parts of the remaining monomeric emulsion have been added. "G 0" means that after the first 100 parts of the monomeric emulsion have been partially polymerized for 15 minutes in the manner described above, the 30 parts of the previously prepared ethyl acrylate copolymer dispersion are added in a single portion and the remaining 900 parts of monomeric emulsion are then added at a uniform rate in the course of 1 hour. The combination "Z 0" means that after the first 100 parts of monomeric emulsion have been partially polymerized for 15 minutes the remaining 900 parts of the monomeric emulsion are added at a uniform rate in the course of 1 hour in admixture with the 30 parts of previously prepared ethyl acrylate copolymer dispersion.

After the entire monomeric emulsion has been added, polymerization is completed by heating at 80°C for a further 30 minutes. After cooling, the resulting aqueous polymer dispersions have the LP and surface tension (ST) values given in columns 5 and 6 of the following table 1:

TABLE 1

| Example | Monomer(s) A | Method (X)[1] X | Y | Resulting dispersions LP value (percent) | ST (dynes/cm.) |
|---|---|---|---|---|---|
| 1 | 100 B | Z | 0 | 28 | 34 |
| 2 | 100 B | Z | 50 | 34 | 38 |
| 3 | 100 B | Z | 75 | 23 | 34 |
| 4 | 100 B | G | 0 | 37 | 40 |
| 5 | 100 B | G | 25 | 29 | 38 |
| 6 | 100 B | G | 50 | 24 | 35 |
| 7 | 100 B | G | 75 | 19 | 34 |
| 8 | 100 St | Z | 0 | 10 | 48 |
| 9 | 100 St | Z | 25 | 13 | 56 |
| 10 | 100 St | Z | 50 | 15 | 57 |
| 11 | 100 St | Z | 75 | 14 | 54 |
| 12 | {97.2 St, 2.8 As} | G | 0 | 33 | 38 |
| 13 | {50 St, 50 B} | Z | 0 | 27 | 39 |
| 14 | {70 B, 30 N} | Z | 90 | 6 | 30 |

[1] Of adding previously prepared dispersion at a rate of Y% of the 900 parts of monomeric emulsion.

EXAMPLE 15 to 19

In each example, 400 parts of monomers (A) as given in the following table 2 are emulsified in a mixture of 40 parts of 20 percent aqueous lauryl sulfate solution and 2 parts of potassium persulfate in 560 parts of water and the pH is adjusted to 9.5 by the addition of aqueous potassium hydroxide. 100 parts of the resulting monomeric emulsion are placed in the polymerization vessel heated to 80°C and polymerized for 15 minutes. The remaining 900 parts of monomeric emulsion are then added in the course of an hour by feeding the monomeric emulsion to the vessel in admixture with 30 parts of a 40 percent aqueous dispersion of a copolymer of 95 parts of ethyl acrylate and 5 parts of acrylic acid, after the proportion of monomeric emulsion given in the third column of table 2 has first been added, said aqueous dispersion having been prepared beforehand in a conventional manner. After all the monomeric emulsion has been added, polymerization of the mixture is completed by heating for a further 30 minutes at 80°C. After cooling, the resulting polymer dispersions have the LP and surface tension (ST) values given in the following table 2:

TABLE 2

| Example | Monomer (A) | Previously prepared dispersion added after addition of X% of the 900 parts of monomeric emulsion X | Resulting LP value (%) | dispersions ST (dynes/cm) |
|---|---|---|---|---|
| 15 | 100 B | 0 | 18 | 32 |
| 16 | 100 B | 25 | 18 | 33 |
| 17 | 100 B | 50 | 30 | 33 |
| 18 | 100 St | 0 | 2 | 35 |
| 19 | 100 St | 50 | 2 | 35 |

EXAMPLES 20 to 32

In each example, 400 parts of monomers (A) as given in the following table 3 are emulsified in a mixture of 2 parts of potassium persulfate in 560 parts of water containing the quantity and type of emulsifying agent indicated in the third column of table 3. 100 parts of the monomeric emulsion are heated to 80°C in a polymerization vessel and polymerized for 15 minutes. Unless otherwise stated, there is then added to the remaining 900 parts of the monomeric emulsion 30 parts of a 40 percent aqueous dispersion, prepared beforehand in a conventional manner, of a copolymer having the composition indicated in the fourth column of table 3 and the resulting mixture is then added at a uniform rate to the polymerization vessel in the course of 1 hour at a polymerization temperature of 80°C with stirring. On completion of the addition, the polymerization of the mixture is completed by heating at 80°C for a further 30 minutes. The LP and surface tension (ST) values of the resulting aqueous dispersions are given in the following table 3.

TABLE 3

| Example | Monomer(s) A | Emulsifier (based on monomer A) | Copolymer in previously prepared dispersion | Resulting dispersion LP value (percent) | ST (dynes/cm.) |
|---|---|---|---|---|---|
| 20 | 100 St | 2% lauryl sulfate | +++++ 50.5 A, 48.5 VAc 1 vinyl alcohol | 2 | 33 |
| 21 | do | do | +++++ 98.5 VAc, 1.5 vinyl alcohol | 2 | 37 |
| 22 | 94 St, 6 MAs | do | 58 VPr, 28 M, 14 As | 6 | 37 |
| 23 | 90 St, 10 MAs | do | do | 21 | 42 |
| 24 | 100 St | 2% potassium oleate | 95 A, 5 MAM | 2 | 41 |
| 25 | do | 1.5% of Na salt of a $C_{13}$ to $C_{17}$ alkyl sulfonic acid mixture 1.5% of emulsifier a. | do | 15 | 44 |
| 26 | do | 2% of emulsifier b | do | 6 | 46 |
| 27 | 97 MM, 3 As | 2% lauryl sulfate | 75 A, 20 As, 5 Am | 48 | 34 |
| 28 | 70 Bu, 30 St+ | 2.5% potassium oleate | 95 A, 5 MAM | 4 | 49 |
| 29 | 59 St, 39 Bu, 2 MAM++ | 2% lauryl sulfate | ++++50.5 A, 48.5 VAc 1.0 vinyl alcohol | 2 | 42 |
| 30 | 54 St, 44 B, 2 MAM++ | do | 58 VPr, 28 M, 14 As | 19 | 49 |
| 31 | 100 VPr+++ | 2% emulsifier a 3% emulsifier c | do | 33 | 37 |
| 32 | 60 B, 40 VAc++++ | do | 55.5 A, 33.5 MAS, 11.0 As | 30 | 37 |

Notes:
+Previously prepared dispersion added after 25% of monomeric emulsion has been added.
++Only 10 parts of previously prepared 40% dispersion used.
+++Previously prepared dispersion added after 95% of monomeric emulsion has been added.
++++Only 20 parts of 40% previously prepared dispersion used.
+++++Vinyl acetate polymer, partially saponified.

Emulsifiers:

a addition product of about 25 moles of ethylene oxide to p-isooctyl phenol b triethanolamine salt of dodecylbenzene sulfonate (mixture of isomers)

c sodium salt of the acidic sulfuric acid ester of a.

COMPARATIVE EXPERIMENTS 1 to 11

Monomers (A) are polymerized in aqueous emulsion as stated in examples 1 to 32 except that no previously prepared aqueous dispersions of polymers are added. Experiments 1 to 11 were carried out for comparison with the examples specified in the second column of the following table 4. The LP and surface tension (ST) values of the aqueous polymer dispersions obtained in the comparative experiments are listed in the third and fourth columns of table 4.

TABLE 4

| Comp. Exp. No. | in comparison with Example(s) No. | LP value (%) | ST (dynes/cm) |
|---|---|---|---|
| 1 | 1 to 7 and 15 to 17 | 78 | 46 |
| 2 | 8 to 11, 18, 19 | 72 | 64 |
| 3 | 12 | 81 | 57 |
| 4 | 22 | 79 | 58 |
| 5 | 23 | 83 | 52 |
| 6 | 27 | 91 | 36 |
| 7 | 28 | 93 | 69 |
| 8 | 29 | 68 | 61 |
| 9 | 30 | 73 | 65 |
| 10 | 31 | 60 | 41 |
| 11 | 32 | 76 | 40 |

Comparison of the LP values and surface tensions given in table 4 with those given in tables 1 to 3 for the corresponding examples (second column, table 4) as regards the composition of the monomeric emulsion shows that the process of the invention produces aqueous dispersion in which the polymer particles are much larger than those in aqueous dispersions prepared under comparable conditions but in a conventional manner.

We claim:

1. In a process for the production of aqueous dispersions of polymers of from 85 to 100 percent by weight of olefinically unsaturated monomers (A) selected from the group consisting of monoolefinically unsaturated carboxylic acid esters containing from four to 20 carbon atoms, styrene, α-methylstyrene, vinyl toluenes, vinyl xylenes, vinyl ethyl styrenes, chlorostyrenes, nitriles of α-β-monoolefinically unsaturated carboxylic acids containing two or three carbon atoms, vinyl halides, vinylidene halides and 1,3-dienes containing from four to six carbon atoms, and from 0 to 15 percent by weight of olefinically unsaturate monomers (A') selected from the group consisting of α,β-monoolefinically unsaturated carboxylic acids containing from three to five carbon atoms, α,β-monoolefinically unsaturated carboxylic acid amides containing three to five carbon atoms, N-hydroxymethyl amides of α,β-monoolefinically unsaturated carboxylic acids containing from three to five carbon atoms, N-alkoxymethyl amides of α,β-olefinically unsaturated carboxylic acids containing from three to five carbon atoms and having from one to four carbon atoms in the alkoxy radical, vinyl sulfonic acid, vinyl phosphonic acid vinyl pyrrolidone, N-vinyl imidazolium salts, vinyl caprolactam, and N-vinyl carbazole in aqueous emulsion and in the presence of conventional dispersing agents, catalysts and previously prepared emulsion polymers of olefinically unsaturated monomers, the improvement which comprises adding, during the polymerization of the monomers (A + A') up to a point where 95 percent of the said monomers (A + A') have been converted, in the form of an aqueous dispersion, from 0.1 to 30 percent by weight (based on the total amount of monomers (A + A') to be polymerized) of previously prepared emulsion polymers containing from 50 to 99.5 percent of their weight of polymerized units of monomers (A) and from 0.5 to 50 percent of their weight of polymerized units of olefinically unsaturated monomers (B) selected from the group consisting of α,β-monoolefinically unsaturated carboxylic acids containing from three to five carbon atoms, amides of α,β-monoolefinically unsaturated carboxylic acids containing from three to five carbon atoms, semi-esters of α,β-monoolefinically unsaturated dicarboxylic acids having four to five carbon atoms with alkanols having from one to three carbon atoms, ester amides of α,β-monoolefinically unsaturated dicarboxylic acids having four or five carbon atoms with alkanols having from one to three carbon atoms, N-vinyl amides of saturated monocarboxylic acids, semi-esters of α,β-olefinically unsaturated carboxylic acids having from three to five carbon atoms with glycols, semi-esters of α,β-monoolefinically unsaturated carboxylic acids having from three to five carbon atoms with polyglycols, Mannich bases of amides of α,β-monoolefinically unsaturated monocarboxylic acids of from three to four carbon atoms, formaldehyde and dialkylamines having from one to 12 carbon atoms in the alkyl radicals, vinyl sulfonic acid, styrene sulfonic acid and vinyl phosphonic acid, the proportion of monomers (A') in admixture with monomers (A) being at least 20 percent (based on the proportion of the polymerized units of monomers (B) in the previously prepared emulsion polymer) smaller than the said proportion of monomers (B) in the previously prepared emulsion polymer.

2. A process as claimed in claim 1 wherein the concentration in said aqueous dispersion of said previously prepared emulsion polymers is 5–60 percent by weight of said aqueous dispersion.

* * * * *